3,365,015
SERVO-ACTION STEERING SYSTEMS FOR
AUTOMATIC AND OTHER VEHICLES
Jean Cadiou, Paris, France, assignor to Societe Anonyme
Andre Citroen, Paris, France, a corporation of France
Filed July 18, 1966, Ser. No. 565,877
2 Claims. (Cl. 180—79.2)

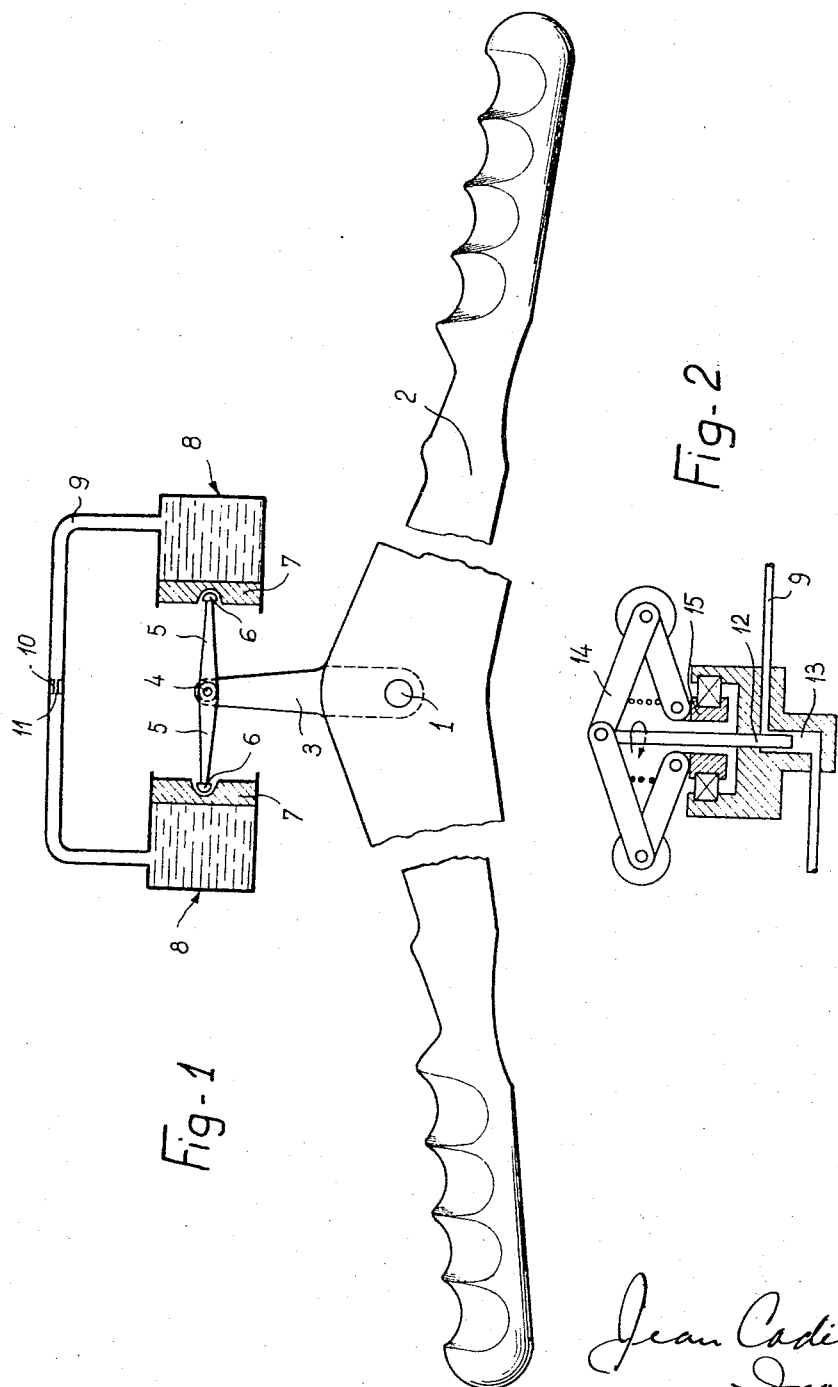

ABSTRACT OF THE DISCLOSURE

A steering system for a vehicle wherein a servo-action system is provided responsive to the angular movements of a steering column. A lever is fixed to such column and a pair of links are pivoted at the outer end of such lever. Two cylinders having pistons are connected by a pipe line. Each of said pistons is connected to a link. Throttling means are provided in the pipe line so that the resistance of the pistons increases with the angular velocity of the column. The throttling means may be controlled by a control means responsive to the vehicle speed to create a variable resistance.

---

The improvements achieved in the field of servo-mechanisms for steering systems of automotive vehicles are so considerable that the reduction or even the suppression of gearing-down may be contemplated in favour of direct steering systems similar to those provided in the past on vehicles in the beginning of the automobile era, or to those mounted at present on motorcycles, even very fast ones. In this case, the conventional steering wheel is replaced by a handlebar adapted to be rotated through less than 90 degrees on either side of its position corresponding to a straight ahead course of the vehicle.

In order to facilitate the adaptation of drivers to this type of steering system, and as disclosed in the U.S. Patent No. 3,171,298 of Mar. 2, 1965, means capable of multiplying or increasing the control effort of the driver, or, as currently expressed, "hardening" the servo-assisted steering as a function of the vehicle speed or of the steering angle of the front wheels, have already been proposed; however, at low speed or when manoeuvring the driver may tend to oversteer the vehicle, due to the low resistance of the steering system under these conditions.

These inconveniences are avoided by the present invention.

It is the object of the present invention to provide a steering system for automotive or other vehicles, and more particularly a servo-action steering system providing a moderate or zero gearing-down, which comprises servo means responsive to the angular movements of a steering column or shaft, this steering system being characterised mainly in that it comprises means capable of exerting on said column a resistance to angular steering movements as a function of the angular velocity of rotation of said column, and also as a function of other parameters such as the vehicle speed and possibly the centrifugal force to which the vehicle is subjected when cornering.

Other features of this invention will appear from the following description of a specific form of embodiment given by way of example and illustrated in the accompanying drawing, in which:

FIGURE 1 is a diagrammatic synoptic view of the handlebar with the means associated therewith for producing a resistance to steering movements; and FIGURE 2 is a diagram showing the jet adjustment means.

Referring to the drawing it will be seen that the steering system according to this invention comprises a steering column or shaft 1 carrying a handlebar 2 and a lever 3 both rigid therewith, this column being operatively connected with servo-action means of a known type (not shown) for controlling the steering angle of the front wheels of the vehicle. A pair of links 5 are pivoted at 4 on lever 3 and engage with their outer or free ball-shaped ends 6 a pair of opposed pistons 7 slidably mounted in corresponding cylinders 8. A connecting pipe 9 provided in its central portion with a throttling device 10 interconnects these cylinders filled beforehand with a suitable fluid, for example moderate-viscosity oil.

The throttling device 10 may consist of a thin-walled diaphragm or a tube section having a bore 11 of reduced diameter, but it may also consist of the connecting pipe 9 proper if its inner diameter is sufficiently small.

In order to make the throttling passage 10 proportional to the vehicle speed, the arrangement illustrated diagrammatically in FIGURE 2 may be resorted to. In this case the throttling member is a slide valve 12 adapted to sink into a section 13 of pipe line 9, the length of this movement being controlled by a centrifugal governor 14 rotatably driven at the speed of the wheels of the vehicle; thus, the higher the vehicle speed, the longer the movement performed by said slide valve 12 inwardly of pipe section 13, and the higher the loss of pressure in the annular fluid passage, thus increasing the steering resistance in proportion.

I claim:
1. Steering system of an automotive or other vehicle including a servo-action steering system providing a moderate or zero gearing system responsive to the angular movements of a steering column comprising a steering column, a lever fixed to said column, a pair of links fulcrumed on the outer end of said lever, two cylinders filled with fluid, a connecting pipe line between said cylinders, throttling means in said pipe line and a piston in each of said cylinders connected to one of said links so that the resistance of said pistons increases with the angular velocity of said column.

2. Steering system as set forth in claim 1, wherein control means for said throttling means is provided responsive to the vehicle speed to create a variable resistance.

References Cited

UNITED STATES PATENTS 3,084,566  4/1963  Pistilio _____ 180—79.2
3,171,298  3/1965  Henry-Biabaud _____ 74—495

BENJAMIN HERSH, *Primary Examiner.*

J. H. BRANNEN, *Assistant Examiner.*